UNITED STATES PATENT OFFICE.

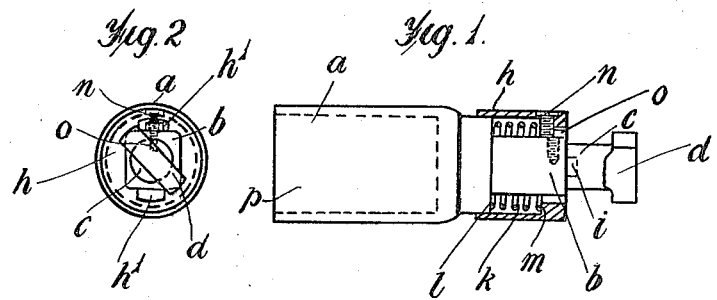
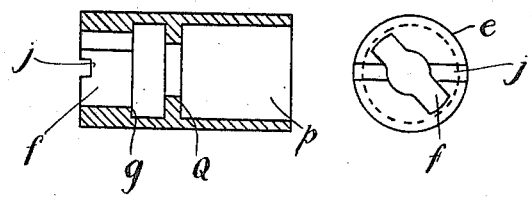
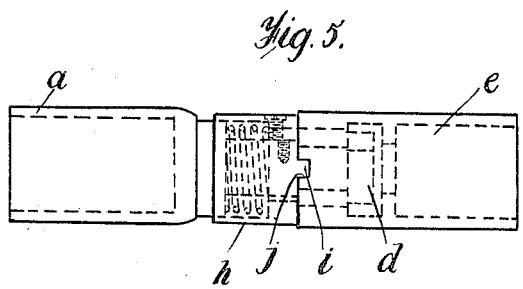

ALGERNON PERCY FORD AND HENRY JOHN MITCHELL, OF LONDON, ENGLAND.

JOINT OR COUPLING FOR RODS OR THE LIKE.

1,306,956.  Specification of Letters Patent.  Patented June 17, 1919.

Application filed November 16, 1917. Serial No. 202,325.

*To all whom it may concern:*

Be it known that we, ALGERNON PERCY FORD, brass-finisher, of 87 Burgoyne road, Harringay, London, N., and HENRY JOHN MITCHELL, brass-finisher, of 19 Birkbeck road, Tottenham, London, N., England, have invented a new or Improved Joint or Coupling for Rods or the like; and we do hereby declare the following to be a full, clear, and exact description of the same.

This invention relates to a joint or coupling for rods or the like and is applicable in every case where lengths of rod or the like have to be joined together end to end. The object of the invention is to provide an improved construction of joint for this purpose by means of which lengths can be easily attached together and easily detached when required. The invention also provides that the lengths will be joined together rigidly, that no working parts are exposed to dirt or disarrangement and that the coupling is of approximately uniform size throughout its length.

According to the present invention the improved joint comprises the following combination of members:—a solid projecting member having an enlargement at its end upon the end of one length of the improved joint, a slot in the end of the second length of the improved joint corresponding to said enlargement and an internal shoulder adapted to be engaged by said enlargement when it has been passed through said slot and given a partial turn, a sleeve member slidably mounted upon the end of one of the lengths so that it cannot rotate with respect thereto and provided with one or more projections or slots adapted to engage with corresponding projections or slots upon the end of the other length, so as to prevent rotation of one length with respect to the other length. The sliding member is preferably spring pressed so that when the co-acting projections and slots are in alinement they will engage automatically.

In the annexed drawing:—

Figure 1 is a part sectional side view of one length of the joint or coupling member and Fig. 2 is an end view thereof.

Fig. 3 is a sectional side view of the other length of the joint or coupling member and Fig. 4 is an end view thereof.

Fig. 5 is a side view of the two halves assembled together.

The end of length $a$, Figs. 1, 2 and 5 is provided with a reduced portion $b$ of squared cross-section and a projecting piece $c$ upon the end of the squared portion $b$ which projecting piece $c$ has an enlargement $d$ of T shape at its end. The end of the length $e$, see Figs. 3, 4 and 5 is provided with a slot $f$ through which the T shaped enlargement $d$ upon the first length $a$ may pass, and an internal shoulder $g$ with which the enlargement $d$ can engage after it has been passed through the slot $f$ and given a partial turn.

Sliding upon the squared portion $b$ of the length $a$ is a sleeve member $h$ having projections $i$ at one end adapted to engage with the corresponding slots $j$ in the end of the other length $e$. This sleeve member $h$ is pressed by a spring $k$ abutting against a shoulder $l$ upon the length $a$ and also abutting against an internal shoulder $m$ upon the sleeve member $h$. This sleeve member $h$ is normally pressed by the spring $k$ toward the end of the length upon which it is mounted and its movement in this direction is limited by the action of a screw $n$ passed through it and engaging with a stop $o$ upon the squared portion $b$ of the length $a$. It will be understood that normally the T shaped projecting end $d$ of the length $a$ projects considerably beyond the sleeve member $h$. Slots $h^1$ are formed in the square hole of the sleeve member $h$ to permit the passage of the enlargement $d$ in assembling the sleeve member $h$ with the length $a$.

In operation the T shaped end $d$ of the one length $a$ is passed through the slot $f$ in the end of the length $e$ and in order to get this enlargement to pass completely through the slot $f$ it is necessary to press back the sleeve member $h$ upon the squared portion $b$ of the length $a$. When the T shaped enlargement $d$ has passed entirely through the slot $f$ a partial turn is given to one length causing the T shaped enlargement to engage with the internal shoulder $g$ and at the same time bringing the projections $i$ on the end of the sleeve $h$ into alinement with the slots $j$ in the end of the other length $e$. Immediately these projections $i$ and slots $j$ come into alinement the spring $k$ forces them into engagement thus making it impossible to turn one length with respect to the other.

When it desired to release the joint the sleeve member $h$ must first be pulled back until the projections $i$ are disengaged from the slots $j$. When this has been done one length can be rotated with respect to the other until the T shaped enlargement $d$ upon the length $a$ can be pulled out through the slot $f$ provided in the end of the length $e$.

It will be understood that this joint is particularly applicable to cleaning rods or other rods used for sanitary purposes or for sweeps' brooms or the like, but may be also employed for connecting the ends of chains or cords, or for connecting motor bicycles to side cars.

In some cases it may be advisable to make the sleeve member of rather less diameter than the rods or the like in order that it will not be liable to catch in any projections or corners and so cause an accidental release of the joint when in use. The sleeve member $h$ may also be knurled or provided with projections so that it can be readily grasped when it is desired to release the joint.

Where the coupling is to be used for rods, chains, cords or the like, sockets $p$ are provided for the reception of the same, and the length $e$ is preferably formed with an internal flange $q$ or other suitable means to prevent the rod, chain, cord or the like from interfering with the insertion of the T shaped end $d$.

As will be readily understood the slots $j$ may be provided on the sleeve member $h$ in which case the projections would be on the length $e$. or any other suitable engaging means may be employed between the sleeve member $h$ and the length $e$. Furthermore we do not limit ourselves to the hereinbefore described particular shape of enlargement.

We claim:

1. A joint or coupling for rods or the like comprising in combination, two coupling halves, a socket on one coupling half, an integral projection of reduced size on said socket, a neck on said projection of rectangular cross-section and less size than said projection, an enlargement at the end of said member, a sleeve sliding on said projection and said neck, an inwardly projecting flange on said sleeve, a spring member inside said sleeve, said spring member abutting against said projection and said flange surrounding said neck, a slot in the end of the second coupling half corresponding to said enlargement, an internal shoulder on said second coupling half adapted to be engaged by said enlargement, and projections and slots on the opposing faces of said sleeve and said second coupling half for the hereinbefore specified purpose.

2. A joint or coupling for rods or the like comprising in combination, two coupling halves, a socket in one coupling half, a projecting member at the end of said socket, an enlargement at the end of said member, a yielding sleeve between said socket and said enlargement, a slot in the second coupling half corresponding with said enlargement, an internal shoulder on said second coupling half and an internal stop on said second coupling half spaced a distance from the internal shoulder exceeding the depth of said enlargement.

In testimony whereof we affix our signatures in presence of two witnesses.

ALGERNON PERCY FORD.
HENRY JOHN MITCHELL.

Witnesses:
GEORGE SIMMONS BARKER,
WILLIAM FINCH.